United States Patent
Hepkin et al.

(10) Patent No.: US 7,653,799 B2
(45) Date of Patent: Jan. 26, 2010

(54) METHOD AND APPARATUS FOR MANAGING MEMORY FOR DYNAMIC PROMOTION OF VIRTUAL MEMORY PAGE SIZES

(75) Inventors: David Alan Hepkin, Austin, TX (US); Randal Craig Swanberg, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 418 days.

(21) Appl. No.: 11/751,004

(22) Filed: May 19, 2007

(65) Prior Publication Data

US 2008/0288718 A1      Nov. 20, 2008

(51) Int. Cl.
    *G06F 12/12*      (2006.01)
(52) U.S. Cl. ..................................................... 711/171
(58) Field of Classification Search ........................ None
    See application file for complete search history.

(56) References Cited

U.S. PATENT DOCUMENTS

| | | | |
|---|---|---|---|
| 7,337,296 B2 * | 2/2008 | Noel et al. ................. | 711/170 |
| 7,487,307 B2 * | 2/2009 | Bitner et al. ................ | 711/159 |
| 2004/0193806 A1 * | 9/2004 | Koga et al. ................. | 711/133 |
| 2005/0050295 A1 * | 3/2005 | Noel et al. ................. | 711/206 |
| 2006/0288187 A1 | 12/2006 | Burugula et al. | |
| 2007/0156981 A1 * | 7/2007 | Bitner et al. ................ | 711/159 |
| 2008/0106769 A1 * | 5/2008 | Ohno ........................ | 358/471 |
| 2009/0113161 A1 * | 4/2009 | Bitner et al. ................ | 711/170 |

* cited by examiner

*Primary Examiner*—Kevin Verbrugge
(74) *Attorney, Agent, or Firm*—Yee & Associates, P.C.; Matthew W. Baca

(57) ABSTRACT

A computer implemented method, apparatus, and computer usable program code for managing real memory. In response to a request for a page to be moved into real memory, a contiguous range of real memory is reserved for the page corresponding to a contiguous virtual memory range to form a reservation within a plurality of reservations for the real memory. This reservation enables efficient promotion of pages to a larger page size. The page only occupies a portion of the contiguous range of real memory for the reservation. In response to a need for real memory, a selected reservation is released within the plurality of reservations based on an age of the selected reservation within the plurality of reservations.

20 Claims, 3 Drawing Sheets

METHOD AND APPARATUS FOR MANAGING MEMORY FOR DYNAMIC PROMOTION OF VIRTUAL MEMORY PAGE SIZES

BACKGROUND OF THE INVENTION

1. Field of the Invention

The present invention relates generally to an improved data processing system and in particular to a method and apparatus for processing data. Still more particularly, the present invention relates to a computer implemented method, apparatus, and computer usable program code for managing real memory to support dynamic promotion of page sizes in virtual memory.

2. Description of the Related Art

A computer system may address memory that is both real and virtual. In a real mode, a memory address register contains the address information that addresses a word or byte of the memory. The memory is addressed sequentially by adding to the address register. The location of the memory being addressed moves forward by the number being added to the address register. In a virtual mode, memory is divided into pages. Most operating systems use a page-virtual memory architecture in which virtual memory is mapped to real memory in units of fixed size pages.

To improve system performance, any computer architectures and operating systems now include support for multiple page sizes. Larger page sizes may significantly improve the performance of hardware translation mechanisms because these larger page sizes allow hardware translation caches to translate larger amounts of memory.

One problem of supporting multiple page sizes is how to efficiently manage real memory to support dynamic promotion of page size. An operating system needs to be able to dynamically remap a contiguous range of virtual memory pages as a single page of a larger page size to support dynamically changing the page size being used for an application. This remapping is also referred to as page promotion. This type of promotion of pages "promotes" smaller page size mappings into a single mapping of a larger page size.

In order to promote a contiguous group of smaller page size mappings into a single mapping for a larger page size, the virtual memory pages are required to be contiguous in real memory. For example, in order to remap the group of sixteen 4K pages as a single 64K page, all of the sixteen 4K pages must be contiguous in real memory. This requirement is needed so that a single 64K page translation can translate the entire virtual memory chunk of 64K.

Thus, in order to promote a group of smaller pages into a larger page, the operating system must make sure that the group of smaller pages is contiguous in real memory. One current mechanism used is to move pages around in the real memory before promoting the virtual pages. With this method, the operating system maps virtual pages into real memory whenever a free page frame is present. As a result, virtual pages are contiguous and the virtual address space is likely to be mapped to discontinuous locations in real memory.

When a dynamic promotion of the group of pages into a larger page is to occur, the operating system can rearrange the pages into a single contiguous range of real memory by moving the pages around in the real memory. This method provides significant flexibility with the initial allocation of pages in real memory. However, this method requires overhead in promoting pages because oftentimes pages have to be rearranged in real memory. If the operating system performs a large number of page promotions, a significant amount of processing may be required to move the pages around in real memory.

Another mechanism that is currently used is to initially map contiguous virtual pages into contiguous locations in real memory. This method involves preserving a contiguous region of memory or a contiguous range of virtual memory. Virtual memory pages are then mapped into the real memory range as pages are referenced.

For example, if an operating system supports page sizes of 4K and 64K, when a first 4K page for a given 64K virtual memory range is to be mapped into memory, the operating system reserves a 64K chunk of real memory. The 4K virtual page is mapped into an appropriate location in this chuck of memory reserved by the operating system. As other virtual memory pages in range are referenced, the operating system maps those pages into other locations in this 64K chuck of memory.

At a later time, when the operating system promotes the group of 4K pages into a 64K page, page movement migrations are not needed because the 4K virtual pages are already contiguous in the real memory. In this manner, this currently used method provides more efficient promotion of pages. This method, however, suffers from a potential waste of memory. Memory reservations made by the operating system to prepare for page promotion may never be used if the application does not trigger promotion threshold to cause the pages for the application to be promoted to a larger page size. This unused reserve memory is effectively wasted. Further, with very large page sizes, such as 256 megabyte pages, reserving memory in these large chunks requires a significant amount of overhead to create these large contiguous chunks of real memory.

Therefore, it would be advantageous to have an improved computer implemented method, apparatus, and computer usable program code for managing memory to support dynamic promotion of virtual memory pages.

SUMMARY OF THE INVENTION

The illustrative embodiments provide a computer implemented method, apparatus, and computer usable program code for managing real memory. In response to a request for a page to be moved into real memory, a contiguous range of real memory is reserved for the page corresponding to a contiguous virtual memory range to form a reservation within a plurality of reservations for the real memory. The page only occupies a portion of the contiguous range of real memory for the reservation. In response to a need for real memory, a selected reservation is released within the plurality of reservations based on an age of the selected reservation within the plurality of reservations.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
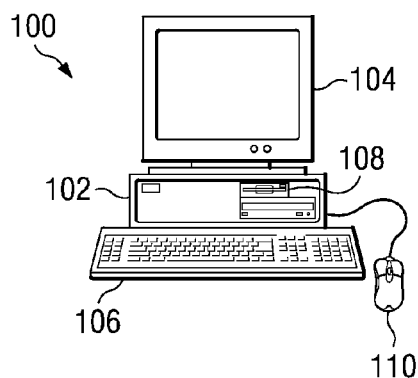
FIG. 1 is a pictorial representation of a data processing system in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices could include, for example, a joystick, a touchpad, a touch screen, a trackball, and a microphone.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
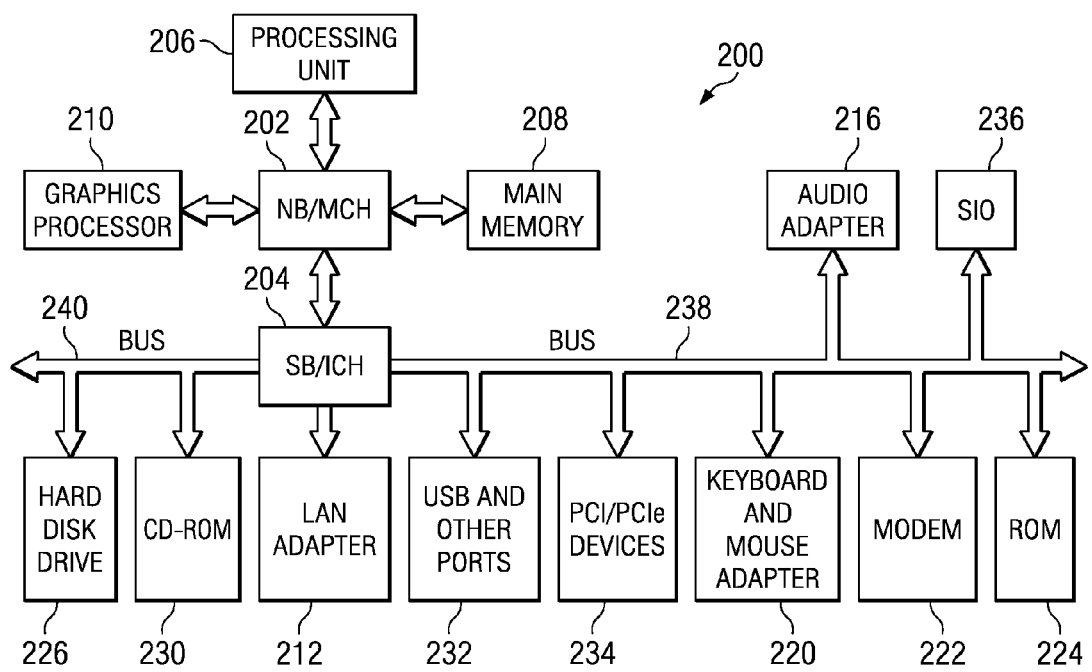
FIG. 2 depicts a block diagram of a data processing system in which illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) and other ports 232. PCI/PCIe devices 234 are coupled to south bridge and I/O controller hub 204 through bus 238. Hard disk drive (HDD) 226 and CD-ROM 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

In the different illustrative embodiments, a computer implemented method, apparatus, and computer usable program code is used to manage real memory. Real memory, in these examples, is physical memory, such as a random access memory, in a computer. This type of memory is in contrast to virtual memory or other memory that is in a persistent storage device, such as a hard disk drive, floppy drive, or an optical disk.

In response to a request for a page to be moved into real memory, a contiguous range of real memory for the page is reserved to form a reservation within a plurality of reservations for the real memory. The page, in these examples, only occupies a portion of the contiguous range of real memory for the reservation. In response to a need for real memory, a selected reservation within the plurality of reservations is released based on the age of the selected reservation.

Figure 3:
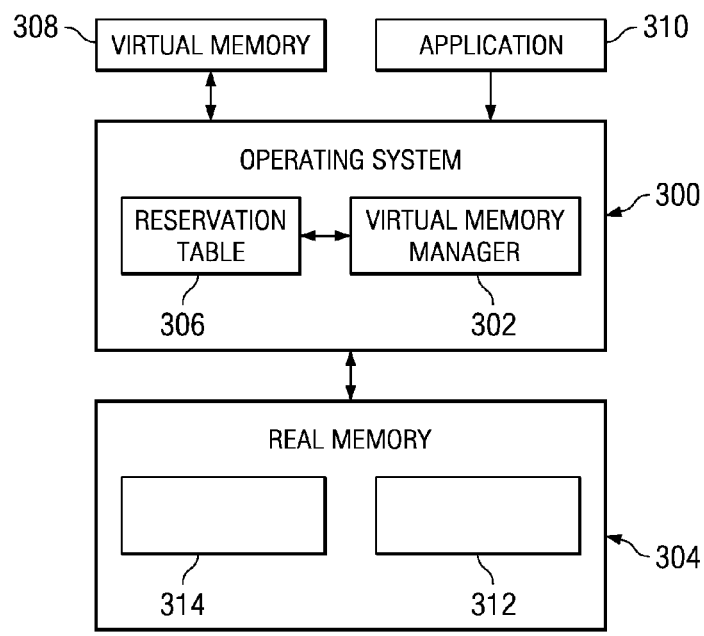
FIG. 3 is a diagram illustrating components used in managing real memory to ensure efficient dynamic promotion of virtual memory page sizes in accordance with an illustrative embodiment.

Turning now to FIG. 3, a diagram illustrating components used in managing real memory to ensure efficient dynamic promotion of virtual memory page sizes is depicted in accordance with an illustrative embodiment. In these examples, operating system 300 contains virtual memory manager 302. Virtual memory manager 302 manages real memory 304. Additionally, virtual memory manager 302 also manages virtual memory and is responsible for bringing pages into real memory 304 from the virtual memory. In these examples, the virtual memory is located on a system storage device, such as a hard disk drive. The mapping of virtual memory 308 in real memory 304 is managed using page table 306 in these examples.

The memory management system provided through virtual memory manager 302, in these examples, reserves contiguous real memory for a range of contiguous virtual memory pages. This type of reservation is made to enable efficient page promotion without having to move pages around in real memory 304. These reservations also are stored in reservation table 306, in these examples. In these examples, reservation table 306 is a separate table from a page table in the operating system.

For example, application 310 requests a page in virtual memory 308. That page is brought into real memory 304. When this reference is made, virtual memory manger 302 makes a memory reservation for a contiguous portion of real memory 304. This contiguous portion may be, for example, section 312 in real memory 304. The reservation of this contiguous range of real memory in section 312 is stored in page table 306. Additionally, this reservation is stored with a time stamp identifying when the reservation was made. Virtual memory manager 302 then places the page from virtual memory 308 into section 312.

As application 310 references additional virtual memory pages in virtual memory 308, these virtual memory pages are brought into real memory 304. These pages also are placed into section 312. At some point, virtual memory manager 302 may promote the virtual memory pages in section 312 into a larger page. Virtual memory manager 302 performs this promotion dynamically by remapping the virtual memory range. The appropriate hardware translation mechanism, such as a hardware page table, may be updated without having to move pages around within real memory 304 because of the contiguous range of real memory reserved in section 312.

For example, if the system supports page sizes of 4K and 64K, virtual memory manager 302 divides objects into regions of 64K. When a first 4K page in a range of 64K is referenced, virtual memory manager 302 reserves a contiguous chunk of real memory that is 64K in size. In this example, section 312 may be a 64K contiguous range of real memory within real memory 304.

Virtual memory manager 302 maps the 4K page from virtual memory 308 into the appropriate portion or piece of the 64K range within section 312. In other words, the 4K page is placed into a frame in the range of sixteen frames located within section 312. As more 4K pages are referenced by application 310 in these ranges, these 4K pages also are mapped into appropriate 4K page frames within section 312.

When it becomes appropriate to promote the virtual memory range in section 312 to a 64K page size, virtual memory manager 302 does not have to move any of the 4K virtual pages located in section 312 in real memory 304 because the 4K virtual memory pages are contiguous within section 312. As a result, virtual memory manager 302 only needs to remap the contiguous range of 4K virtual pages as a single 64K page virtual page.

Additionally, virtual memory manager 302 may release memory reservations when free real memory in real memory 304 is low. This type of release of reservations is to be performed to avoid wasting memory. Virtual memory manager 302, however, gives applications, such as application 310, an opportunity to use the memory reservation before taking the reservation away.

In these examples, with reservations of contiguous ranges of real memory 304, it is possible to over reserve real memory 304 for a given virtual memory range. If virtual memory manager 302 reserves a large contiguous real memory range over a contiguous virtual memory range, application 310 may only use a small number of virtual memory pages within that range. In this example, section 314 contains a 256 megabyte contiguous range of real memory 304. If only a small number of virtual memory pages are used within section 314, the rest of section 314 is never consumed. As a result, the portion of 314 that remains unused within real memory 304 is effectively wasted.

In the illustrative embodiments, unreserved real memory is not wasted because virtual memory manager 302 will release reservations for real memory 304 when additional real memory 304 is needed. Virtual memory manager 302 does not release all of the reservations. Instead, virtual memory manager 302 selectively releases reservations based on a time at which the reservation was made. Specifically, virtual memory manager 302 examines the reservations within page table 306 to identify memory reservations that are older than a selected or certain time threshold.

This time threshold may be, for example, thirty seconds. With a time threshold, virtual memory manager 302 releases reservations that are older than the time threshold. Alternatively, virtual memory manager 302 also may release reservations within page table 306 by identifying an oldest or set of one or more reservations that are the oldest within reservation table 306. Either, or a combination of these two schemes may be used. Other schemes when releasing reservations also may be employed, depending on the particular implementation. The idea is to release some of the reservations rather than all of the reservations to satisfy the need for additional real memory 304.

For example, if virtual memory manager 302 identifies that a certain amount of real memory is needed in addition to what is available in real memory 304, virtual memory manager 302 may release reservations so that amount of memory is needed. In these examples, two types of thresholds are used. The first threshold is a threshold that is based on the number of free page frames (i.e. the amount of free real memory). This threshold determines whether a system is running low on free real memory 304. The second threshold is a threshold for determining which real memory reservations to release. In other words, the second threshold is a time-based threshold and is not based on the amount of free real memory 304.

Thus, virtual memory manager 302 will monitor the amount of free real memory 304. When the amount of free real memory 304 drops below a low memory threshold (e.g. when there is less than 10 MB of free memory), virtual memory manager 302 will then try to release reservations in reservation table 306. Virtual memory manager 302 will only release reservations that are older than some minimum time threshold. One example of this minimum time threshold is 30 seconds.

By releasing reservations based on a time threshold, applications, such as application 310, are ensured an opportunity to reference the virtual memory pages and have their pages promoted to a larger size as before the reservations for those pages are released.

Virtual memory manager 302 may monitor the amount of free real memory in real memory 304. When the amount of free real memory in real memory 304 reaches or falls below the low threshold, virtual memory manager 302 may release unused reservations that have the time stamp that is older than the threshold. Alternatively, the reservation release may be one for memory that is only partially used.

For example, with a threshold of thirty seconds, application 310 has at least thirty seconds of time to reference the memory to trigger a page promotion. If a page promotion does not occur within thirty seconds, the reservation made for application 310 can be released, releasing the unused free memory within the reservation.

The threshold set for releasing reservations also may be varied over time. For example, the minimum time may be decreased as the memory load on the system increases. This memory load may be, for example, increase in paging. This type of change in threshold provides for a more progressive system of releasing reservations. Also, the minimum amount of time for a threshold may be increased as the memory load lessens.

Additionally, virtual memory manager 302 may make a reservation for a contiguous range of real memory based on a page size that is less than the maximum page size allowed for a page supported in the system. This type of selection avoids significant over allocations in systems in which very large page sizes are supported.

In this example, a system supports page sizes of 4K, 128K, and 256 Meg, dividing the virtual memory into 256 Meg ranges each time a first 4K page in the 256 Megabyte regions reference could lead to a significant amount of over reservation of real memory 304. This type of reservation also could lead to a significant amount of wasted work in trying to reserve memory in these size units.

As a result, an optimal page size may be selected for reservations. This page size is used to allow for efficient promotion of smaller pages up to this page size. The target optimal page size is used to identify the contiguous range of real memory that is reserved when a page is first referenced. Consequently, virtual memory manager 302 is able to promote pages up to the page size without having to move pages around. This page size may vary as the workload or process changes.

With this type of selection of pages, virtual memory manager 302 also may migrate or move pages to rearrange virtual memory pages to allow for promotion to a larger page size than the ones selected for reserving a contiguous range of real memory 304. For example, if an operating system supports page sizes of 4K, 64K, 128K and 256 Meg, an operating system may select 128K as a target optimal page size. This page size is used to generate the reservations to allow more efficient promotion to 64 and 128K pages. Virtual memory manager 302 may then use page migration to promote pages up to 256 Meg pages.

Figure 4:
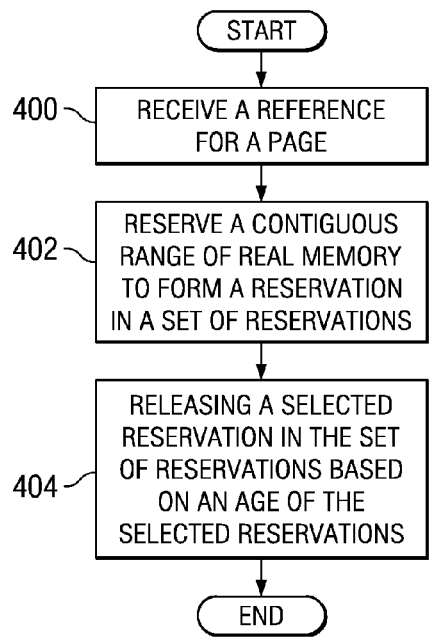
FIG. 4 is a wish level flowchart of a process for managing real memory in accordance with an illustrative embodiment.

Turning now to FIG. 4, a wish level flowchart of a process for managing real memory is depicted in accordance with an illustrative embodiment. The process illustrated in FIG. 4 may be implemented in a component, such as virtual memory manager 302 in FIG. 3.

The process begins by receiving a reference for a page (step 400). Thereafter, a contiguous range of real memory is reserved to form a reservation in a set of reservations (step 402). The set of reservations is the set of one or more reservations in these examples. A selected reservation in the set of reservations is released based on an age of the selected reservation in response to a need for freeing real memory (step 404) with the process terminating thereafter.

Figure 5:
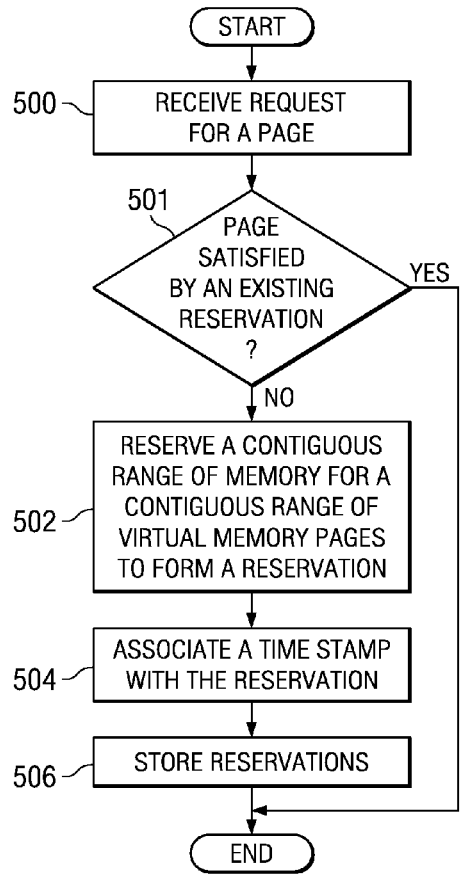
FIG. 5 is a flowchart of a process for creating a reservation in accordance with an illustrative embodiment.

Turning now to FIG. 5, a flowchart of a process for creating a reservation is depicted in accordance with an illustrative embodiment. The process illustrated in FIG. 5 may be implemented in a component, such as virtual memory manager 302 in FIG. 3.

The process begins by receiving a request for a page (step 500). This request is a reference for a first page in virtual memory in these examples. A determination is made as to whether the page being referenced can be satisfied using an existing reservation (step 501). The determination made in step 501 is used to see whether the page being referenced is associated with or belongs with one or more pages in a section of memory that has already been reserved. If the page being referenced can be satisfied using an existing reservation, the process terminates.

Otherwise, a contiguous range of memory for a contiguous range of virtual memory pages is reserved to form a reservation (step 502). A time stamp is associated with the reservation (step 504).

The reservation is then stored (step 506) with the process terminating thereafter. In these examples, the reservation is stored in a data structure, such as reservation table 306 in FIG. 3. The reservation could be stored in other types of data structures depending on the particular implementation. For example, a linked list may be used to store these reservations.

The process illustrated in FIG. 5 is initiated each time a page is reference by an application in these examples. Alternatively, rather than ending the process in FIG. 5 after the reservation is store, the process may wait for an application to reference a page and then return to step 500.

Figure 6:
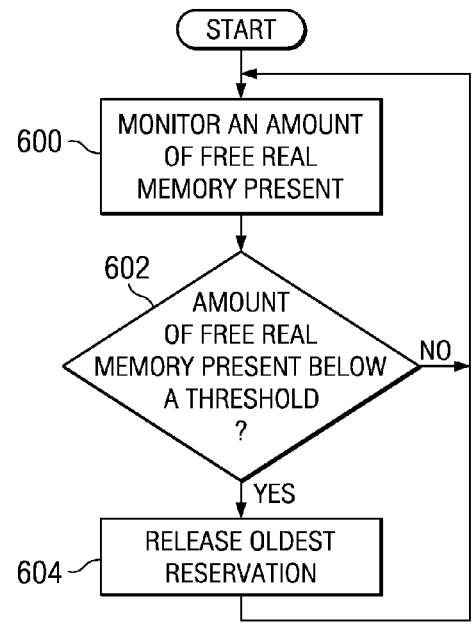
FIG. 6 is a flowchart of a process for managing memory in accordance with an illustrative embodiment.

Turning now to FIG. 6, a flowchart of a process for managing memory is depicted in accordance with an illustrative embodiment. The process in this example may be implemented in a software component, such as virtual memory manager 302 in FIG. 3.

The process begins by monitoring an amount of free real memory that is present (step 600). A determination is made as to whether the amount of free real memory present is below a threshold (step 602). If the amount of free real memory present is not below the threshold, the process returns to step 600.

Otherwise, an oldest reservation is released (step 604) with the process then returning to step 600 as described above. The releasing of reservations occurs until the amount of free real memory is no longer below a threshold.

Figure 7:
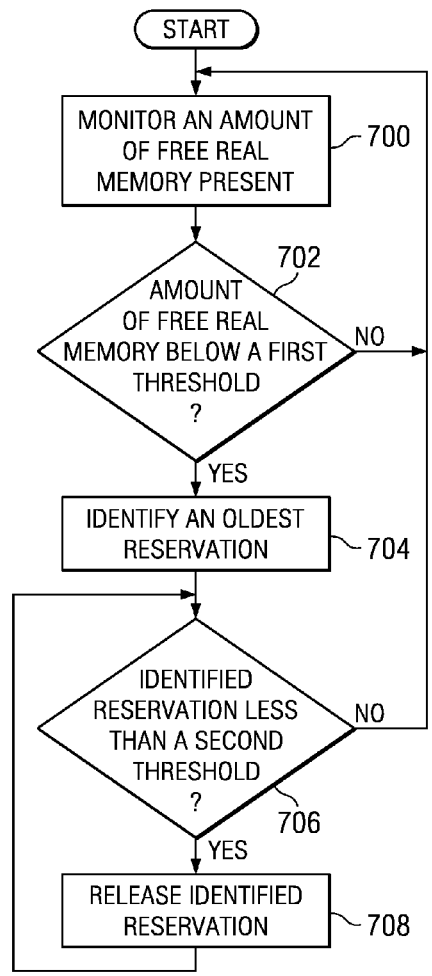
FIG. 7 is a flowchart of a process for managing memory in accordance with an illustrative embodiment.

Turning now to FIG. 7, a flowchart of a process for managing memory is depicted in accordance with an illustrative embodiment. The process illustrated in FIG. 7 may be implemented in a software component, such as virtual memory manager 302 in FIG. 3.

The process begins by monitoring an amount of free real memory that is present (step 700). Next, a determination is made as to whether the amount of free real memory is below a first threshold (step 702). Depending on the implementation, this determination could be whether the amount of free real memory has reached a threshold. If the amount of free real memory is not below a first threshold, the process returns to step 700.

Otherwise, an oldest reservation in a set of reservations is identified (step 704). A determination is then made as to whether the oldest reservation is less than a second threshold (step 706). If the oldest reservation is not less than the second threshold, then memory is not released at this point in time, the process returns to step 700. If the identified reservation is less than the second threshold, then the identified reservation is released (step 708) with the process then returning to step 706.

This type of implementation gives an application an opportunity to promote a page before the reservation is released. For example, a second threshold may be set for thirty seconds. This gives the application thirty seconds to fill up the range of contiguous real memory and promote the page to a larger size. Otherwise, the reservation is then available to be released based on its age.

The different thresholds in these examples may be varied depending on the implementation. For example, as workloads increase, the threshold level of memory may be increased at which reservations begin to be released. The threshold level at which memory reservations are considered for release may be reduced in time as workloads increase. These two threshold levels may be varied in the other direction once the workloads decrease for a system.

Thus, the different illustrative embodiments provide a computer implemented method, apparatus, and computer usable program code for managing real memory. The different embodiments reserve a contiguous range of real memory for a page to form a reservation within a plurality of reservations for the real memory in response to receiving a request for the page to be moved into real memory. The page only occupies a portion of the contiguous range of real memory for the reservation. In response to a need for real memory, a selective reservation may be released within the plurality of reservations based on an age of the selected reservation within the plurality of reservations.

In this manner, different illustrative embodiments may provide different advantages. Not all embodiments may provide all the same advantages that result from the different features. The different embodiments allow for efficient promotion of pages to a set of larger pages. This promotion may be performed without incurring the overhead of moving pages around real memory in most cases. Further, real memory is not wasted using the different features of the illustrative embodiments. The different embodiments allow unused real memory to be reclaimed from memory that has been reserved for a virtual memory range. As a result, memory is not wasted by reserving real memory for a virtual memory range that may never be used.

Time stamps are used in the different embodiments to identify when to release reservations. The time stamps are used to release reservations older than a threshold in these examples. This type of feature is employed to target releasing real memory from applications that are not likely to use the different reservations. This feature also allows applications an opportunity to promote pages before the reservation is released. Further, the different features are transparent to applications. Unused memory reserved by the virtual memory manager to enable efficient page promotions are not counted as in use and are not counted to a process. As a result, the different illustrative embodiments also do not visibly increase memory utilization of applications.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing real memory, the computer implemented method comprising:

responsive to a request for a page to be moved into real memory, reserving a contiguous range of the real memory for the page corresponding to a contiguous virtual memory range to form a reservation within a plurality of reservations for the real memory, wherein the page only occupies a portion of the contiguous range of the real memory for the reservation; and responsive to a need for the real memory, releasing a selected reservation within the plurality of reservations based on an age of a selected reservation within the plurality of reservations.

2. The computer implemented method of claim 1, wherein the reserving step further comprises:

associating a time stamp with the reservation.

3. The computer implemented method of claim 1, wherein the releasing step comprises:

selecting the selected reservation as being the reservation having the age that is greater than a threshold; and releasing the selected reservation, wherein unused portions of the contiguous range of the real memory may be used.

4. The computer implemented method of claim 1, wherein the releasing step further comprises:

selecting the selected reservation as being the reservation having an oldest age in the plurality of reservations; and releasing the selected reservation, wherein the unused portions of the contiguous memory may be used.

5. The computer implemented method of claim 1 further comprising:

monitoring an amount of free real memory; and identifying the need for the free real memory is present if the amount of the real free memory present is less than a threshold.

6. The computer implemented method of claim 3, wherein the threshold changes and workloads change.

7. The computer implemented method of claim 1, wherein the reserving step and the releasing step are performed by an operating system.

8. The computer implemented method of claim 7, wherein a virtual memory manger in the operating system performs the reserving step and the releasing step.

9. An apparatus comprising:

a real memory; and an operating system, wherein the operating system reserves a contiguous range of real memory to form a reservation within a plurality of reservations for the real memory in response to a request for a page to be moved into the real memory, wherein the page only occupies a portion of the contiguous range of real memory for the reservation; monitors the real memory to determine whether an amount of free real memory present is less than a threshold; and releases the selected reservation within the plurality of reservations based on an age of the selected reservation within the plurality of reservations in response to the amount of free memory being less than the threshold.

10. A computer program product comprising:

a computer usable medium storing computer usable program code for managing real memory, the computer usable program code comprising:

computer usable program code, responsive to a request for a page to be moved into real memory, for reserving a contiguous range of real memory for the page corresponding to a contiguous virtual memory range to form a reservation within a plurality of reservations for the real memory, wherein the page only occupies a portion of the contiguous range of real memory for the reservation; and computer usable program code, responsive to a need for the real memory, for releasing a selected reservation within the plurality of reservations based on an age of the selected reservation within the plurality of reservations.

11. The computer program product of claim 10, wherein the computer usable program code responsive to a request for a page to be moved into real memory, reserving a contiguous range of real memory for the page corresponding to a contiguous virtual memory range to form a reservation within a plurality of reservations for the real memory further comprises:

computer usable program code for associating a time stamp with the reservation.

12. The computer program product of claim 10, wherein the computer usable program code responsive to the need for the real memory, releasing the selected reservation within the plurality of reservations based on the age of the selected reservation within the plurality of reservations comprises:

computer usable program code for selecting the selected reservation as being the reservation having the age that is greater than a threshold; and computer usable program code for releasing the selected reservation, wherein unused portions of the contiguous range of the real memory may be used.

13. The computer program product of claim 10, wherein the computer usable program code responsive to the need for the real memory, releasing the selected reservation within the plurality of reservations based on the age of the selected reservation within the plurality of reservations comprises:

computer usable program code for selecting the particular reservation as being the reservation having an oldest age in the plurality of reservations; and computer usable program code for releasing the particular reservation, wherein the unused portions of the contiguous range of the real memory may be used.

14. The computer program product of claim 10 further comprising:

monitoring an amount of free real memory; and computer usable program code for identifying the need for the free real memory is present if the amount of the free real memory present is less than a threshold.

15. The computer program product of claim 12, wherein the threshold changes and workloads change.

16. A data processing system comprising:

a bus;

a communications unit connected to the bus;

a storage device connected to the bus, wherein the storage device includes computer usable program code; and a processor unit connected to the bus, wherein the processor unit executes the computer usable program code to reserve a contiguous range of real memory for a page corresponding to a contiguous virtual memory range to form a reservation within a plurality of reservations for the real memory, in which the page only occupies a portion of the contiguous range of the real memory for the reservation in response to a request for the page to be moved into the real memory and release a selected reservation within the plurality of reservations based on an age of the selected reservation within the plurality of reservations in response to a need for the real memory.

17. The data processing system of claim 16, wherein in executing the computer usable program code to reserve the contiguous range of the real memory for the page corresponding to the contiguous virtual memory range to form the reservation within the plurality of reservations for the real memory, the processor unit executes the computer usable program code to associate a time stamp with the reservation.

18. The data processing system of claim 16, wherein in executing the computer usable program code to release the selected reservation within the plurality of reservations based on the age of the selected reservation within the plurality of reservations in response to the need for the real memory, the processor executes the computer usable program code to select the selected reservation as being the reservation having the age that is greater than a threshold; and release the selected reservation, wherein unused portions of the contiguous range of the real memory may be used.

19. The data processing system of claim 16, wherein in executing the computer usable program code to release the selected reservation within the plurality of reservations based on the age of the selected reservation within the plurality of reservations in response to the need for the real memory, the processor executes the computer usable program code to select the particular reservation as being the reservation having an oldest age in the plurality of reservations; and release the particular reservation, wherein the unused portions of the contiguous range of the real memory may be used.

20. The data processing system of claim 16, wherein the processor unit executes the computer usable program code to monitor an amount of free real memory; and identify the need for the free real memory is present if the amount of the free real memory present is less than a threshold.

* * * * *